Dec. 3, 1968          P. L. LESTER          3,414,225
MOUNTING MEANS FOR THERMALLY RESPONSIVE SWITCHES
Filed Nov. 4, 1966
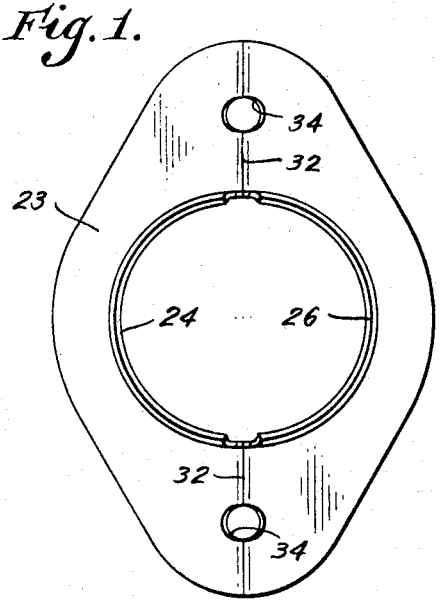
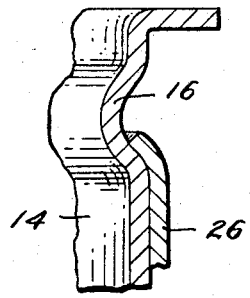
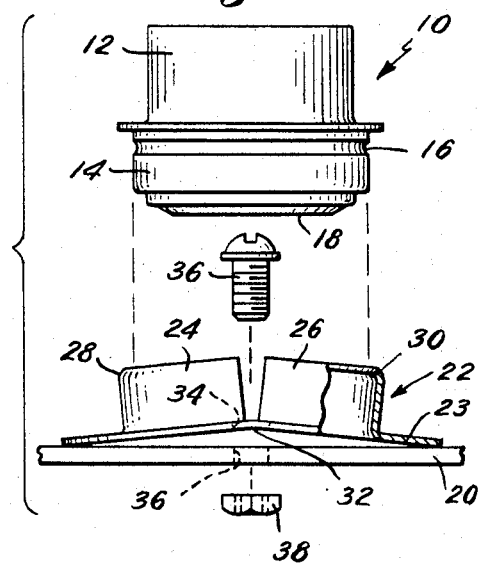
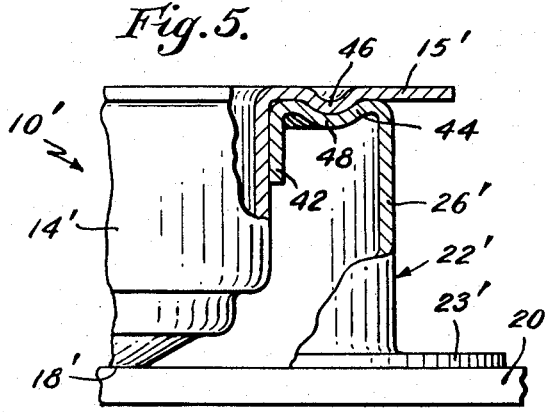
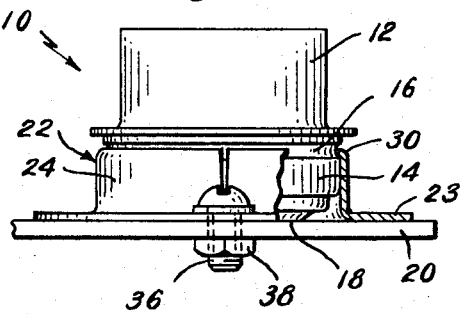
INVENTOR.
Philip L. Lester,
BY
John A. Haug
Att'y.

United States Patent Office
3,414,225
Patented Dec. 3, 1968

3,414,225
MOUNTING MEANS FOR THERMALLY
RESPONSIVE SWITCHES
Philip L. Lester, Lexington, Ky., assignor to Texas Instruments Incorporated, Dallas, Tex., a corporation of Delaware
Filed Nov. 4, 1966, Ser. No. 592,109
6 Claims. (Cl. 248—361)

ABSTRACT OF THE DISCLOSURE

A mounting bracket for mounting thermally responsive electric switches in heat transfer relationship with a mounting surface comprising a generally annular flange having an upstanding wall with gripping surfaces thereon. Two different gripping surfaces are shown. The annular flange is pre-bent into a first position allowing ingress and egress of the switch and which is biased by means of fasteners into a second position in which the switch is not only tightly gripped but is also forced into firm physical contact with the mounting surface.

---

This invention relates to a mounting bracket for mounting thermally responsive electric switches in a firm heat transfer relationship with a mounting surface, the temperature of which is to be sensed.

The invention is an improvement on the mounting bracket disclosed and claimed in U.S. Patent No. 3,157,768, which issued Nov. 17, 1964, assigned to the assignee of this application.

The bracket of the instant invention consists of a generally annular flange to which is attached an upstanding wall having gripping surfaces thereon. The flange is pre-bent into a first non-gripping position allowing ingress and egress of the switch housing and which is biased into a second gripping position through the use of fasteners, in which position the switch is tightly gripped and forced into firm thermal contact with the mounting surface.

Among the several objects of this invention may be noted the provision of thermally responsive electric switches and detachable flanges therefor; the provision of such switches and mounting flanges which can be quickly and easily detachably secured together; the provision of such devices wherein one electric switch can be employed with and detachably connected to anyone of several different types of interchangeable mounting flanges; and the provision of electrical switches and detachable mounting flanges therefor which are economical to manufacture and which can be quickly and economically assembled. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the appended claims.

In the accompanying drawings in which several of the various and possible embodiments of the invention are illustrated:

FIG. 1 is a top plan view of a mounting bracket embodying the invention;

FIG. 2 is an exploded elevational view of a thermally responsive switch, the bracket of FIG. 1, and fastening means;

FIG. 3 is an elevational view showing the thermally responsive switch firmly mounted in heat transfer relationship with a mounting surface;

FIG. 4 is a partial cross-section of the thermally responsive switch housing and the gripping surface of the mounting bracket; and FIG. 5 is a partial elevation partly in cross-section of a second embodiment of the invention.

Similar reference characters indicate corresponding parts throughout the several views of the drawings.

Dimensions of certain of the parts as shown in the drawings may have been modified and are exaggerated for the purposes of clarity of illustration.

It is to be understood that the invention is not limited in its application to the details of construction and arrangements of parts illustrated in the accompanying drawings, since the invention is capable of other embodiments and are being practiced or carried out in various ways. Also, it is to be understood that the phraseology or terminology employed herein is for the purpose of description and not of limitation.

U.S. Patent 3,157,768, referred to supra, teaches the use of providing a plurality of different interchangeable detachable mounting brackets or flanges, anyone of which can quickly and easily be detachably connected to a standard type of thermostatic switch. Thus, as taught by that patent, one or more standard types of thermostats or electrical switches can conveniently and economically be mass produced and supplied with a kit of assorted types of interchangeable mounting flanges, each of which can be quickly and easily detachably connected to the thermostat so as to mount the thermostat on a support in thermal juxtaposition to a substance or device whose temperature is to be sensed.

The structure in the above patent employs the use of lip portion 70 and tab 72 between which a flange 80 is received and locked into place. However, in certain situations dimensional limitations preclude the use of such projecting portions. The instant invention obviates the above objection as well as provides means for positively forcing the switch against the surface which temperature is to be sensed thereby providing a more efficient thermal path from the surface to the thermally responsive switch.

Referring now to FIGURES 1–4, a thermally responsive electric switch 10 is shown which may be employed in the practice of the instant invention. Switch 10 is of the type shown in U.S. Patent 3,157,768 referred to supra. Electric switch 10 includes a two part housing 12 and 14. Base 12 is formed of an electrically insulating material such as one of the customary molded plastics and is closed by a metallic heat conductive cap or housing member 14. An annular groove 16 is formed in housing member 14 as by spinning or turning in the member 14 about its periphery. Disposed within housing 14 is a thermally-responsive snap-acting disc (not shown) in close proximity to bottom wall 18 of housing 14.

Switch 10 is mounted to a mounting surface 20 by means of mounting bracket 22 which is formed of a generally annular oval shaped flange 23 to which is attached upstanding wall portions 24 and 26 which together form a generally cylindrical body. The free end of wall portions 24, 26 are turned inwardly at 28 and 30 respectively for a purpose to be described infra.

Flange 23 is bent upwardly as seen in FIGURE 2, along bending line 32 which intersects the axis of the cylinder formed by wall portions 26 and 28. It will be noted that this line generally coincides with the axial split between these two wall portions.

Also provided along bending line 32 are apertures 34 which are intersected by the bending line. Threaded fasteners 36 are inserted through apertures 34 in flange 23 and 36 in mounting surface 20. Nuts 38 cooperate with fasteners 36 to fixedly mount the bracket 22 to mounting surface 20.

The bending of flange 23 along line 32 causes free end portions 28 and 30 to move outwardly to a first non-gripping position to provide ingress and egress for switch 10.

It will be noted that as the fastening means are tightened flange 23 is brought into contact with surface 20 causing free end portions 28 and 30 to move inwardly to a second gripping position in which the free end portions fit into groove 16 and apply a force against housing member 14 both inwardly and downwardly toward mounting surface 20 forcing bottom wall 18 into a firm heat transfer relationship with surface 20. This insures optimum response and performance of switch 10.

Referring now to the FIGURE 5 embodiment, it is particularly useful with switches having a housing 14' with a smooth cylindrical side wall, that is not having the groove 16 located in member 14 of the FIGURE 1–4 embodiment.

The FIGURE 5 embodiment employs similar split cylindrical wall portions 24' and 26', and bendable flange 23' as shown and described in FIGURES 1–4. In the FIGURE 5 embodiment, however, the distal portion of walls 24' and 26' are formed in an inverted U-shaped lip having free end 42 and bight 44.

Housing member 14' of switch 10' is provided with outwardly extending flange 15'. Flange 15' is preferably formed with projections 46 which may be annular in shape or may take the form of a plurality of dimples spaced around the periphery of flange 15'. Annular groove 48 may be formed in bight 44 into which is received projection 46. This serves to implement the fastening of switch 10' to bracket 22'.

Free ends 42 of walls 26', 28' are movable between a first non-gripping position where the flange 23' is not tightly held against mounting surface 20 and a second gripping position where flange 23' is held tightly against surface 20. In this position free end 42 is forced inwardly against housing 14' of switch 10' and downwardly forcing bottom wall 18' of switch 10' against mounting surface 20.

Flange 15' provides structural support for housing 14' preventing collapse of the housing due to the compressive forces exerted by end 42. To benefit from the added structural strength of housing 14' in the environs of flange 15' wall portions 26' and 28' are of such length that free end 42 engages housing 14' in close proximity to flange 15'.

In view of the above it will be seen that the several objects of the invention are achieved and other advantageous results attained.

I claim:
1. Apparatus for mounting a thermally responsive switch having a cup-shaped housing comprising
    a mounting bracket,
    the bracket having gripping surfaces adapted to grip the cup-shaped housing,
    the bracket being provided with a flange portion pre-bent so that the gripping surfaces are in a first non-gripping position permitting ingress and egress of the housing, and
    means including at least one fastener to mount the bracket to a mounting surface and to bias the flange forcing the gripping surfaces to move to a second gripping position placing a force on the housing and toward the mounting surface whereby the housing is held in contact with the mounting surface in heat transfer relationship therewith.

2. Apparatus according to claim 1 in which the cup-shaped housing is provided with a depressed area into which the gripping surfaces fit in the second position.

3. Apparatus according to claim 2 in which the depressed area is a groove formed in the periphery of the housing and the flange portion is generally annular and attached to an upstanding wall and the distal portion of the wall is turned inwardly to form the gripping surface.

4. Apparatus according to claim 1 in which the flange portion is generally annular and attached to an upstanding wall, the distal portion of the wall being formed with an inverted U-shaped lip and the bight portion and free end of the lip is adapted to engage the housing.

5. Apparatus according to claim 4 in which the housing is formed with a radially extending flange having projections formed therein; and the bight portion of the lip has a groove adapted to receive therein the projections.

6. Apparatus according to claim 1 wherein the flange is attached to an upstanding generally cylindrical wall, the free end of which is turned inwardly to form the gripping surfaces; the flange is bent along a line which intersects the axis of the cylindrical wall, the wall is axially split along the line into two portions; at least two apertures are formed in the flange and intersected by the line; and fastening means are inserted through the apertures to mount the bracket on a mounting surface and bias the flange to move the gripping surfaces inwardly.

References Cited

UNITED STATES PATENTS

| | | | |
|---|---|---|---|
| 2,354,015 | 7/1944 | Handley et al. | 248—361 |
| 2,503,854 | 4/1950 | Trainor | 287—20 XR |
| 2,662,220 | 12/1953 | Saari | 248—361 |
| 3,157,768 | 11/1964 | Ladd et al. | 200—138 |
| 3,163,393 | 12/1964 | Strong | 174—52 XR |

ROY D. FRAZIER, *Primary Examiner.*

J. F. FOSS, *Assistant Examiner.*